ic Office 3,216,792
Patented Nov. 9, 1965

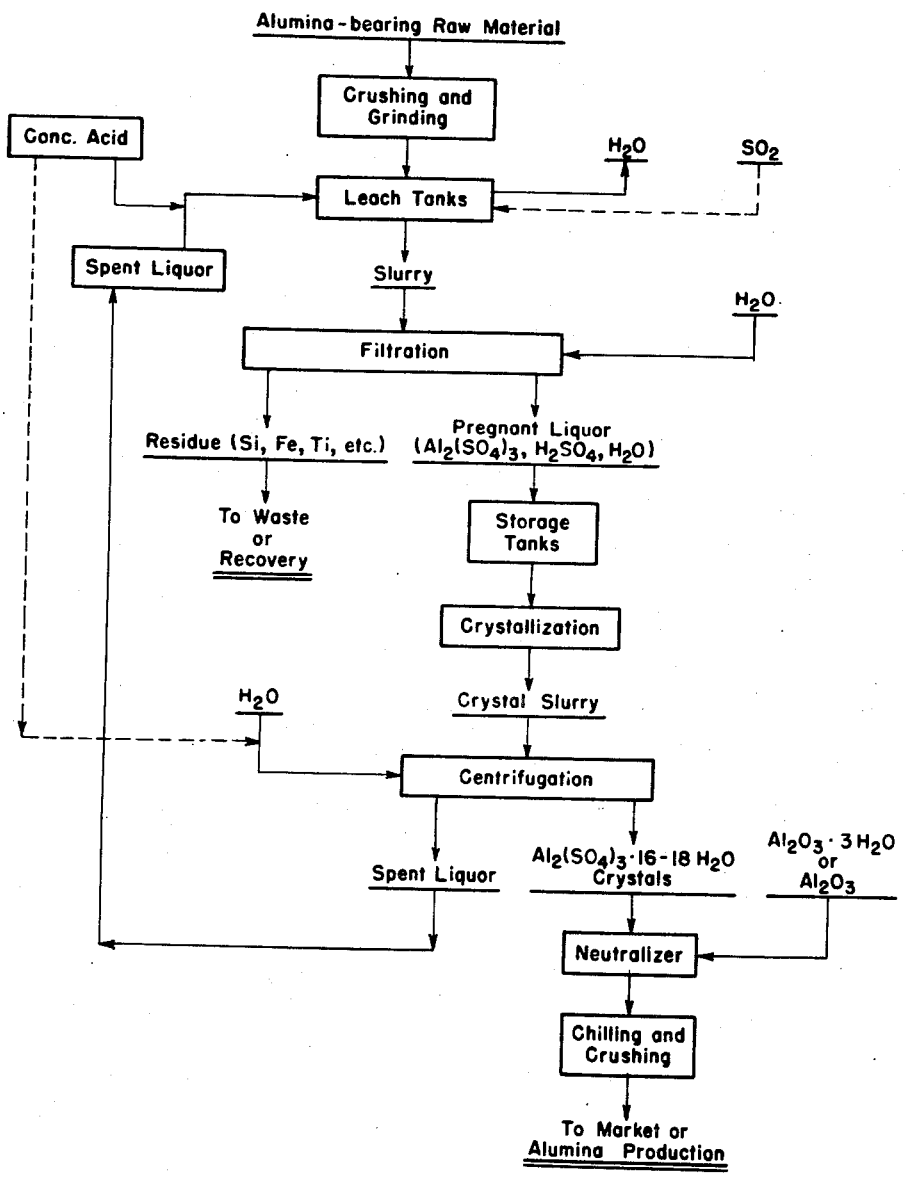

3,216,792
HYDROMETALLURGICAL PROCESS
Marvin J. Udy, deceased, late of Niagara Falls, N.Y., by Tessa Udy and Murray C. Udy, co-executors, Niagara Falls, N.Y., assignors, by mesne asignments, to The North American Coal Corporation, a corporation of Ohio
Filed May 28, 1962, Ser. No. 198,380
18 Claims. (Cl. 23—123)

This application is a continuation-in-part of application Serial Number 125,620, filed June 15, 1961, now abandoned in favor of this application.

This invention relates to hydrometallurgy and has for a principal object the provision of an improved process for the production and recovery of aluminum sulfate from alumina-bearing materials such as ores, clays, shales, slags, concentrates and waste residues. More particularly, the invention contemplates the provision of an improved and extremely simplified acid process for the extraction and recovery of normal aluminum sulfate hydrate from alumina-bearing materials of the general class described including, for example, normal bauxite ores; high-silica, high-iron bauxite ores, alumina-bearing clays; low-grade alumina-containing titaniferous iron ores; red mud residues from the Bayer alumina process; waste alumina-bearing residues and overburdens from coal mining and cleaning operations; alumina-containing-slags; and natural silicates of aluminum such as sillimanite and andalusite ($Al_2SiO_5$), cyanite [$(AlO)_2 \cdot SiO_3$], fibrolite ($Al_2O_3 \cdot SiO_2$), and mullite ($3Al_2O_3 \cdot 2SiO_2$), among others; or hydrous aluminum oxides such as diaspore ($Al_2O_3 \cdot H_2O$); or alums of the type of alunite $$[K_2SO_4 \cdot Al_2(SO_4)_3 \cdot 4Al(OH_3)]$$

among others.

While aluminum is the most plentiful common metal in the earth's crust, the only commercial process for its production and recovery, namely, the Bayer-Hall process, is directly dependent on the use as starting materials of high-grade bauxite deposits which are relatively scarce and scattered. Measures for the avoidance of this dependency have intrigued metallurgical researchers for many decades and, although the subject of countless publications, patents and technical proposals, it is significant that no commercially feasible process has heretofore been placed in operation which actually overcomes this critical dependency on selective, high-grade starting materials. For the most part, such proposals have failed to meet with commercial success for the simple reason that none was able to operate on an economic and competitive basis with the exisiting practices in industry.

Prominent among the prior proposals aimed at utilizing certain of the lower-grade starting materials are those processes which involve the intermediate production of some form of aluminum sulfate or alum. While these materials all require further processing to derive the high-purity alumina required as charge to the Hall aluminum reduction process, it must be noted that the sulfate, per se, finds many valuable applications in industry. Processes of this type generally employ sulfuric acid to digest the raw alumina-bearing material (either with or without various pre-treatment operations), thereby separating the metallic values in sulfated form from the insoluble silica and gangue constituents, which are discarded. In these processes, the alumina bearing acid solution, or liquor, is allowed to cool to a temperature where, variously, acid salts, alums and potash alums precipitate therefrom, and the precipitate is separated from the spent liquor and further processed to produce a normal, or neutral aluminum sulfate. It is essential to effect the removal of contained iron from both the solution and the crystals, and in known processes of the general type referred to, several successive precipitations, crystallizations or chemical treatments are generally pursued before the product is brought to the required degree of purity.

As an example of the foregoing type of operation, the process described in U.S. Patent Number 2,476,979, issued July 26, 1949 to E. C. Hoeman, is believed to be typical. Thus, an alumina-bearing clay or other silicate of aluminum is digested in a large excess (4 or 5 times the stoichiometric amount) of a strong solution of sulfuric acid having a concentration carefully maintained at approximately 48° Bé., the digestion being carried out at a temperature of from 130° C. to 140° C. This is followed by separation of the pregnant liquor from the solid residue at a temperature of 80° C. or higher. The residue is washed with a sulfuric acid solution of precisely equivalent concentration (48° Bé.), and then washed with water, the washings being added to the feed acid after several cycles, and the washed residue being discarded. Ultimate crystallization of aluminum sulfate from the liquor, along with impurities such as iron, is effected by cooling the liquor to a temperature between 25° C. and 35° C., followed by separation and recovery of the same by filtration. In the Hoeman process, by reason of the acid centration of 55° or 66° Bé., where the contained imcrystallization stages, the aluminum sulfate is precipitated and recovered in the form of crystalline acidic aluminum sulfate of approximate composition corresponding to $Al_2(SO_4)_3 \cdot YH_2SO_4 \cdot XH_2O$, where Y and X are 3 and 7, respectively. The latter product, essentially useless in this form, is then subjected to successive multistage washings with concentrated sulfuric acid to remove impurities and convert the salt to the less acidic form of aluminum sulfate having the approximate compositions, $$Al_2(SO_4)_3 \cdot H_2SO_4 \cdot 3H_2O$$

The wash acid also contains $SO_2$ functioning to reduce ferric sulfate to the ferrous form. Thereafter, the washed acid sulfate must be further thermally treated at a temperature within the range of from 140° C. to 180° C. to convert it into substantially normal aluminum sulfate [$Al_2(SO_4)_3$] through elimination of residual sulfuric acid. Hereinafter the terms neutral aluminum sulfate and normal aluminum sulfate will be used in referring to $Al_2(SO_4)_3$, either with or without water of hydration. The wash acid must be purified by evaporating to a concentration of 55° or 66° Bé., where the contained impurity sulfates become insoluble and are separated by filtration; the purified acid being recycled to the digestion stage.

The principal disadvantage of the foregoing process, as with many others, is that the product of the initial crystallization still contains most of the impurities and is not recovered in the form of the desired normal sulfate, but rather, a sulfate which requires substantial aftertreatment, entailing both large acid losses and additional equipment.

It is significant to note that a much more recent patent, namely U.S. No. 2,958,580, issued November 1, 1960 to H. Loevenstein, further perpetuates the general technology and practices advocated by Hoeman, in that, the iron is again taken into solution, and must be removed by electrolytic means prior to precipitation of the aluminum sulfate. While this patent specifies simply that there occurs "precipitation of aluminum sulfate," and does not state which of the various salts is actually recovered, the use of cold, 90% acid by the patentee renders it quite obvious that one of the acid salts, rather than the normal salt, is produced.

Still another prior process which is of interest in comparison with the process of the present invention is that described in German Patent No. 232,563 of May 27, 1908. In accordance with the teachings of this patent, an excess of acid is used to keep the iron in solution while the aluminum values are crystallized therefrom in sulfated form. In the embodiment of the patented process which involved the production of aluminum sulfate, a fifty percent (50%) excess over the stoichiometric quantity of 40° Bé. sulfuric acid is employed (600 kg. of acid to 200 kg. of raw clay) for digestion purposes. When digestion is complete, the solution is filtered and cooled, the aluminum sulfate is crystallized and the iron is held in solution. While this mechanism is ascribed to the excess of acid employed, the process of the German patent utilizes a smaller excess than is employed in the aforementioned Hoeman patent, wherein the iron is deliberately precipitated with the aluminum and removed by subsequent treatment. The aluminum sulfate salt recovered in the process of the German patent requires further purification by redissolution in hot sulfuric acid and recooling to effect recrystallization.

In the initial devlopment phases of the process of the present invention, the foregoing processes, as well as other more distantly related techniques were considered, but rejected, in the knowledge that the economics of the situation demanded a method of treatment whereby: (1) the normal or neutral salt could be recovered on the first crystallization; (2) recovery of aluminum values would be substantially complete; (3) removal of iron and other impurities could be accomplished in the initial digestion step with a high degree of efficiency, i.e., insuring a product of sufficient purity to meet rigid commercial specifications; and (4) build-up of impurities in the mother liquor would not prevent the process from being practiced on a continuous basis. Briefly, the process of the present invention in achieving the foregoing objectives involves the initial sulfuric-acid digestion of suitably crushed raw materials under conditions designed to effect substantially complete elimination of iron in the initial stage. The digestion operation is carried out under carefully controlled conditions under which the iron is rendered insoluble in the solution, so that the major portion of the iron is never allowed to become a part of the pregnant liquor, but is immediately discharged from the system at the outset along with the solid silica residue. In this manner, the largest proportion of the iron present in any given starting material never enters the aluminum sulfate phase at all and, as will be seen hereinafter, this unique expedient alters the overall prevailing equilibrium conditions of the system in such a manner that each of the above stated objectives can be attained by means which are simple, efficient and economical. As will also appear from the detailed description presented hereinafter, the conditions and relative solubilities which promote the iron removal in the initial stage of the process are also effective in promoting the removal of most other gangue constituents of the raw material.

After producing a substantially pure pregnant liquor by means of the foregoing measures, the impurity-laden residue is separated by filtration, during the course of which water is added to wash the residue free of contained aluminum sulfate and adjust the concentration of both acid and sulfate in the liquir to insure crystallization of the normal or neutral salt during the subsequent crystallization operation. As the normal neutral salt is obtained directly and its iron content is well below commercial requirements, the resulting crystals need only be prepared for direct marketing. Thus, following separation, the crystals will normally contain approximately six to eight percent (6-8%) free acid physically entrained therewith, and, as a slightly basic salt is desired in commerce, neutralization of the crystals is desirable. For this purpose, the crystals are simply heated to effect dissolution of the same in their own water of crystallization. Alumina trihydrate or any other acid soluble alumina is then added to the resulting solution in sufficient quantity to neutralize the residual excess acid and to impart the desired degree of basicity to the solution. The neutralized solution is cooled and solidified, and this material is then crushed and packaged for market. Of course, the neutralized solution may be marketed directly as a standard alum solution.

The spent liquor from the crystallization operation is recycled directly to the leaching stage, where it is brought to the proper concentration and volume by the addition of fresh acid. The efficiency of impurity removal in the leaching stage is attested to by the fact, documented hereinafter, that the recycled spent liquor following more than 20 complete cycles of the process evidences no noticeable build-up of either iron or any other impurity present in the system. This factor, coupled with the high-purity of the aluminum sulfate produced and the high extraction efficiency of the process, indicates the magnitude of the improvements which are inherent in the operation of the process. As compared to known processes, the present invention eliminates all steps necessary to convert the crystallized salt to the normal hydrate, successive purification, recrystallization, and all acid purification steps.

If one considers the leaching of an alumina-containing raw material it becomes obvious that as various entities contained in the material are dissolved the character of the solvent is constantly changing. At the initial point where contact is made between the solvent and the raw material, one can truly say that leaching is being done with an acid of certain strength or concentration. Immediately after this point of initial contact, however, the solvent becomes a more complex mixture containing aluminum sulfate, larger or smaller quantities of impurities such as iron or alkali metal sulfates and, as these materials are added to the solvent, the resultant chemical reactions result in changes in free acid and water concentrations. Recognition of the effects of these changes and their control are the crucial areas in which this process differs from all prior teachings and which result in the obtainment of a pregnant liquor of suitable purity.

Thus, as a result of extensive research within the field of the invention, it has been established that time, temperature, aluminum sulfate concentration and acid strength are all intimately related, and the combined effect of these variables is carefully controlled within the present process to provide a concentrated liquor in which the acid salts of aluminum sulfate are avoided. According to the reaction mechanism defined in detail hereinafter, in order to achieve maximum solubilization of contained alumina values from any given starting material while at the same time inhibiting solubilization of impurities, notably iron, to any great extent, a relatively high concentration of sulfate ions is desirable. Conditions for optimum alumina leaching and solubilization, however, do not necessarily coincide with the conditions which have been found to be essential for the maximum discharge of impurities such as iron from the system within the solid silica residue and for the formation and crystallization of the neutral or normal salts of aluminum sulfate, but, as mentioned hereinbefore, unless deliberate measures are adopted to maintain constant acid concentrations and the like during leaching, the character of the solvent changes constantly during the course of the leaching operation. As a consequence, it may not even prove necessary under some circumstances to adjust the acid concentration following leaching to achieve the latter two objectives as well as maximum solubilization of the alumina during the leaching. That is to say, unlike the mechanism of Hoeman and other prior workers in this general field, wherein the acid concentration during leaching is constantly maintained at a value consistent with maximum solubilization of all sulfate-formers, including iron, in accordance with the unique process of the present invention, either by reason of the choice of acid concentration and its amount in proportion to the alumina-containing starting material, or because of deliberate adjustments to the pregnant liquor made prior to filtration and/or crystallization, the $H_2SO_4$ concentration is brought to a value below about 46 percent by weight and above about 30 percent by weight; the approximate upper and lower limits found to be essential for the eventual crystallization of a neutral or normal aluminum sulfate hydrate of extremely low impurity content.

Between these limits of 46–30 percent by weight $H_2SO_4$, the maximum and minimum acid concentrations that will promote neutral salt formation, it has been found that the required acid concentration varies in an inverse relationship to the aluminum sulfate concentration of the solution. The character of this inverse relationship is also effected by the temperature at which the crystallization is carried out. Thus, if crystallization is to be carried out in the normal range of around 60° C., for example, an aluminum sulfate concentration of 20% will yield the neutral salt only when the acid concentration is about 40% or lower, within the range specified. On the other hand, if crystallization is to proceed at 25° C., a similar concentration of aluminum sulfate (20%) will require that the acid concentration be no more than 30%. The inverse nature of this relationship at a given temperature, therefore, may be expressed as follows: the highest allowable concentration of acid may be determined by subtracting the percentage of aluminum sulfate from a constant; the constant being determined by temperature. It has been found, for example, that when crystallizing at about 60° C. this constant is approximately 60 but at temperatures around 25° C., the constant is closer to 50. Accordingly, when crystallizing at the higher temperature, a 15% concentration of aluminum sulfate indicates that the acid concentration should be 45% or less. If the aluminum sulfate amounts to 20%, 40% or less concentration of acid is indicated at 60° C. Expressed in other terms, it can be stated that for crystallization at this order of temperature (i.e., 60° C.), the total of acid and aluminum sulfate concentration, in weight percent, should be about 60. At the lower temperatures, the total should be nearer to 50. In general practice, therefore, within the aforesaid acid concentration range 30–46 percent $H_2SO_4$ by weight necessary for neutral salt formation, a concentration of $Al_2(SO_4)_3$ of from 10–20 percent by weight of the pregnant liquor will insure admirable operating conditions for ready formation and crystallization of high-purity normal aluminum sulfate hydrate, bearing in mind, of course, the interrelationship of these concentrations to the temperature at which crystallization is effected.

Significantly, the process of the present invention also yields economies of time in carrying out the leaching step. By way of comparison, in accordance with the process of the present invention a reaction time of 1½ hours yields the desirable neutral salts, whereas at 4½ hours, for example, the recommended leaching time taught by the aforementioned German patent, more alumina is dissolved, the resulting solution is pregnant with the acid salts, and high solubilization of undesirable impurities results. This phenomenon is further exemplified by the teachings of Hoeman which are based on acid-salt formation, wherein the patentee verifies the high degree of solubilization of impurities, particularly iron, realized in his initial leaching. When the acid salts of Hoeman are thermally decomposed to the neutral salt, however, and the subsequent wash acid (containing neutral salt) is at a suitable concentration (also implying a higher concentration of neutral salt) the impurities are finally precipitated.

While the precise mechanism of the foregoing unique technique of the present invention has not been firmly established, the accumulated experimental evidence points towards two most feasible possible phenomena. The common ion effect is one obvious explanation of the mechanism. This assumes that the neutral salt ionizes in the proper acid concentration required for its formation, and the presence of a sulfate ion inhibits the solution of other undesirable sulfates. Still an additional and corollary effect can be postulated for the mechanism, wherein it is assumed that the formation of a neutral salt is possible only under conditions wherein the sulfuric acid is still in ionic form. Thus, if the sulfuric acid concentration exceeds a certain value in relation to dissolved alumina, an acid salt commences to form due to the presence of non-ionized sulfuric acid. At this point, sulfates of various impurities become more soluble inasmuch as the sulfate ions formerly present by reason of the ionization of sulfuric acid are no longer available. Thus, under the conditions of operation controlled with respect to the process of the present invention, one maintains a high concentration of sulfate ions which functions to inhibit solution of impurity sulfates. On the other hand, under conventional operating techniques which lead to acid-salt formation, this concentration is sharply decreased.

Another possible mechanism for the enhanced efficacy of the present process is that the aluminum sulfate (in the neutral salt form) exercises a unique precipitating effect on iron salts, whereas the acid salts of aluminum sulfate conversely exert a solubilizing effect. This is an extremely plausible mechanism, in that, the solubility of iron sulfate in the leach solutions of the present invention is considerably below that given for this material within sulfuric acid of equivalent concentration.

It is further postulated that solutions of acid aluminum sulfates exhibit greater solubility for iron sulfates than sulfuric acid, per se. There are many analogous situations firmly established within industry. For example, it is well known that small concentrations of copper sulfates in sulfuric acid greatly increase the ability of the acid to dissolve iron, over and above anything that could be expected by reason of the effect of the replacement of copper in solution by an equivalent molar quantity of iron. For example, the aforementioned patentee Hoeman reports that his crystals of acid aluminum sulfate do indeed contain iron contamination which is removed during the conversion of these salts to neutral crystals. It is also apparent that the quantity of iron which must be in solution is considerably above the solubility given for iron sulfate in sulfuric acid of equal strength without any aluminum acid sulfate.

It is believed that a more complete understanding of the principles and procedures of the invention will be gained by referring to the following detailed description thereof, taken in conjunction with the single drawing, which contains a flow sheet or flow diagram outlining the various steps in the process as explained herein.

*Comminution.*—The degree of comminution that is necessary for effective leaching varies, as would be expected, with the raw material used. As in all such operations, leaching time bears a direct relation to the fineness of the charge, but some minerals are found to react much more quickly than others. Thus, a coal mine waste crushed to 50% (−100) mesh yields satisfactory results, whereas it was found necessary to crush a Jamaican bauxite to 50% (−325) mesh to insure the same results. For any given raw material it is simply necessary to determine the optimum degree of comminution that will promote effective leaching within a reasonable length of time, keeping in mind the need for reasonable filtration rates which might be adversely affected by excessive size reduction.

*Leaching.*—It is in the leaching phase that the process of the invention differs, initially, from all practices advocated heretofore. Thus, as described above, by effecting the removal of iron and most other soluble materials at this stage of the process, a pregnant alumina-containing liquor of remarkable purity is obtained and, by virtue of having obtained such a pure leach liquor, the remainder of the process is greatly simplified, as compared to all known techniques. As also noted previously, the purity of the liquor is evidenced by the fact that the same residual acid or mother liquor can be used in almost endless successive cycles of the process without showing any build-up of impurities that would effect the purity of the crystals.

The literature in the field of the present invention provides a great deal of information on the solubility of various sulfate-forming radicals in water and acid solutions at various temperatures. These tabulations uniformly indicate that ferric iron and other sulfate formers normally present in bauxite ores, mine waste, clays and the like invariably, upon sulfuric acid leaching, go into solution along with the alumina values. This result has been accepted by all prior researchers in this field, and their processes uniformly provide for the reduction and removal of iron from the spent liquor after crystallization of the sulfate (e.g., German patent) and/or from the crystals themselves (e.g., Hoeman). As a result of extensive research conducted on virtually every type of iron-alumina-bearing material, it has been firmly established that by the practice of the present invention the great majority of the iron and other impurities can be removed with the silica residue, rather than being crystallized with the crystals or remaining in the mother liquor solutions.

The acid employed for leaching should be of a concentration of from approximately 40° to 60° Bé. (or from approximately 40% to 80% $H_2SO_4$ by weight), and a concentration of about 45° Bé. (55% by weight) is actually preferred for optimum results. Recycled acid is generally of the order of 45% $H_2SO_4$, and is adjusted to the proper concentration and volume for leaching by appropriate additions of fresh concentrated (90-98%) acid and/or water. In general, the acid is employed in a stoichiometric excess, and desirably in an amount equal to at least twice the normal stoichiometric requirements to produce a pregnant liquor containing as aluminum sulfate substantially all of the alumina content of the starting material. A ratio of 4 to 1 acid to raw material has been used advantageously in the actual practice of the process of the invention. As described previously, however, the quantity of alumina to be dissolved and the acid concentration remaining after effecting this solution, as well as the time of treatment (which effects the quantity of alumina being put into solution), must be considered for each material in arriving at optima acid-to-raw material ratios. Leaching is carried out at an elevated temperature, and, preferably, at temperatures ranging from 100° C. up to the boiling point of the acid. When leaching with the aforementioned optimum of 45° Bé., acid, for example, a temperature of approximately 133° C. is found to be entirely satisfactory in actual practice.

With some materials, it may prove desirable to treat the leach slurry, either during or after leaching, with sulfur dioxide or an equivalent reducing agent, thereby further minimizing iron contamination of the liquor and sulfate crystals. While the use of such reagents to reduce iron from the ferric ($Fe^{+++}$) to the ferrous ($Fe^{++}$) state is known, per se, this expedient has not been used heretofore during the leaching operation itself. Whether sulfur dioxide or another reductant is used or not is dependent primarily on the purity of the product desired and the type of material being treated. Thus, for example, the production of low-iron aluminum sulfate crystals from Jamaican bauxite is aided only slightly by use of $SO_2$ during leaching, whereas substantially improved results are obtained through use of such a reductant with a furnace slag resulting from preliminary smelting for iron removal from a red mud residue. On the other hand, a product of entirely adequate purity is recovered without use of $SO_2$ when treating coal mine waste or overburden. In connection with this type of treatment, it is important to note that the temperaure is found to be relatively critical for optimum reducing action, and to insure maximum iron removal and minimum loss of alumina values, such a reduction treatment should preferably be conducted while the leach slurry is established and maintained at a temperature within the range of from 70–71° C., that is to say, subsequent to the leaching operation, provided this temperature advantage is to be utilized.

As pointed out hereinabove, the time necessary for the leaching mechanism depends, in part, on the fineness of the raw material employed and the quantity of the alumina to be dissolved. Generally, a leach time of 1½ hours is sufficient to complete the reactions as promoted pursuant to the leaching mechanism of the invention.

At a leach temperature just below the boiling point of the acid, vapors passing off will be mostly water. To avoid undue concentration of the acid due to this evaporation, it may be advisable to utilize a reflux condenser on the leach tank. Conversely, this condenser may be by-passed or eliminated so as to remove water in order to adjust and control acid concentration, as hereinbefore described.

Significantly, another important feature of the process of the invention resides in the fact that substantially no costly evaporation procedures of the type generally encountered heretofore are necessary in order to reconstitute the mother liquor and other residual acid solutions for reuse in the process.

*Filtering.*—At the completion of the leaching step, the slurry is filtered, centrifuged or the solids are separated by multi-stage decantation to recover the pregnant liquor from the insoluble silica and iron residue. Solids separation is advantageously performed while the slurry is still hot, with optimum results being secured when the slurry is maintained at a temperature of the order of 90–110° C.

The silica residue will unavoidably contain a modest quantity of acid which is tied up with the various impurity elements contained therein, as well as an additional quantity of free acid. The latter may be recovered for return to the system by simply washing the residue with hot water or dilute acid either during or after filtration. Addition of such wash water or acid to the liquor is a convenient means for adjusting acid concentration, so as to insure maximum elimination of impurities as insolubles in the residue and the formation and eventual crystallization of the neutral salt, as described hereinbefore. While the silica residue can normally be considered a waste material in terms of the economics of the process, it is considered obvious that useful products can be derived therefrom by suitable additional processing measures.

The alumina-containing acid solution remaining after solids separation is pumped to the concentrated liquor tank, while maintained at a temperature of above approximately 65° C. It is preferred to pass the pregnant liquor through a polishing filter prior to crystallization. Crystallization follows by application of conventional thermal techniques. As emphasized hereinbefore, a principal feature of the leaching mechanism resides in the fact that the normal hydrated salt ($Al_2(SO_4)_3 \cdot 16$–$18H_2O$) is recovered directly. The product of the crystallization operation is in the form of a slurry of the crystals in residual free acid.

The crystal slurry is then filtered or centrifuged to separate the major portion of the free acid from the crystals; washing of the crystals with a sulfuric acid solution being advantageously practiced in this operation. In the washing operation, 46% $H_2SO_4$ is found to be adequate, but water, or weaker acids (i.e., 30–35% $H_2SO_4$), can be utilized.

It is significant to note that in more than twenty (20) cycles of the process no buildup of impurities in the acid has been encountered. Accordingly, following separation of the acid from the hydrated crystals, it is recycled directly to the leaching operation and needs only the addition of a suitable quantity of fresh acid to re-establish it at optimum strength and volume as taught hereinbefore.

*Neutralization.*—In view of the fact that some free acid will generally remain mechanically entrained in the sulfate crystals, and since it is commercially desirable to provide a slightly basic product, a neutralization step is effected in order to finish the crystals. This is accomplished by simply heating the crystals until they dissolve in their own water of crystallization, generally at a temperature of about 100° C. A small quantity of alumina trihydrate ($Al_2O_3 \cdot 3H_2O$) or alumina ($Al_2O_3$) of suitable solubility is then added to the solution, the exact quantity being determined by simple calculations based on the acidity of the solution. When neutralization is complete, the solution is suitably cooled and solidified. Following crushing it is then ready for marketing or further processing by thermal decomposition or the like to provide cell-grade alumina.

To summarize the foregoing detailed description, it will be seen that the process of the invention comprises essentially the following sequence of steps:

(a) An alumina-bearing siliceous material containing iron, among other possible impurity elements, is subjected in finely-divided form to the leaching action of sulfuric acid at a temperature between approximately 100° C. and the boiling point of the acid; the acid at the start only of such leaching action being at a concentration of between 40–80 percent $H_2SO_4$ by weight, and being employed in a stoichiometric excess, and preferably in an amount equal to at least twice the normal stoichiometric requirements to produce a pregnant liquor containing as aluminum sulfate substantially all of the alumina content of the material;

(b) The leaching action is continued for a period of the order of 1½ hours, sufficient to produce the desired pregnant aluminum sulfate solution and a solid residue comprising silica and a major proportion of the iron and other impurities-content of the material; the $H_2SO_4$ concentration of the pregnant liquor being established due to the control of leaching conditions, per se, or by suitable adjustments of the pregnant liquor at not over about 46 percent and not less than about 30 percent $H_2SO_4$ by weight, and at a concentration of $Al_2(SO_4)_3$ of not over about 20 percent by weight of the pregnant liquor when at a temperature of about 60° C.;

(c) The pregnant liquor, separated from the solid silica residue while still hot and preferably at a temperature of the order of 90–110° C., is then advantageously passed through a polishing filter while maintained at a temperature of above approximately 65° C.;

(d) The resulting solution is then crystallized to recover directly, a slurry of normal aluminum sulfate hydrate, $Al_2(SO_4)_3 \cdot 16-18H_2O$, in residual free acid the major portion of this free acid being separated from the crystals by filtering or centrifuging, advantageously with concurrent washing of the crystals being effected through use of a sulfuric acid solution or water;

(e) The acid recovered from the hydrated crystals as well as the wash acid and mother liquor are suitably reconstituted by the addition of fresh concentrated sulfuric acid and are then recycled directly to the leaching stage; and (f) Any residual free acid remaining mechanically entrained in the sulfate crystals is neutralized, preferably by heating the crystals to dissolution in their own water of crystallization, and adding to this solution a small quantity of alumina trihydrate or soluble alumina.

The following examples illustrate the specific application of the foregoing principles and procedures to the production of high-purity hydrated aluminum sulfate from typical ores and residues of the general class defined hereinbefore:

EXAMPLE I

The material treated consisted of an alumina-bearing coal mine waste or overburden taken directly from the mine in the form of chunks averaging about 28 inches by 8 inches. This material was fed to a primary jaw crusher, a secondary cone crusher, a hammer mill, and further processed until it was 100% −16 mesh and 50% −100 mesh. For the test run 345.7 pounds of this crushed material of the following analysis were used:

| | Percent |
|---|---|
| $Al_2O_3$ | 22.91 |
| $SiO_2$ | 54.24 |
| C | 4.96 |
| S | 2.96 |
| Alkali ($Na_2O$) | 2.83 |
| $Fe_2O_3$ | 3.86 |
| $TiO_2$ | 1.04 |
| MgO | 0.78 |
| CaO | 0.70 |
| Moisture | 0.87 |
| Other | 4.85 |
| Balance | 100.00 |

The raw material was fed into the first leach tank together with 216.1 pounds of new concentrated (92%) sulfuric acid and 1579.5 pounds of recycled spent liquor from previous operations. The resulting leach liquor contained 55 percent $H_2SO_4$ (45° Bé.), and its weight was 5.2 times the weight of the solid material. Leaching was carried out at approximately 133° C. for slightly more than 1½ hours. No sulfur dioxide or other reductant was used with this particular material. During the leaching cycle, 116.7 pounds of water were evaporated, leaving, at the end of the cycle, 2024.6 pounds of leach slurry. This was filtered and washed, 336.5 pounds of wash water being added at this time, resulting in 421.1 pounds of silica residue and 1940 pounds of pregnant liquor of the following analyses:

*Silica residue*

| | Percent |
|---|---|
| Inerts | 59.9 |
| $H_2SO_4$ | 2.0 |
| $H_2O$ | 37.3 |
| $Al_2(SO_4)_3$ | 0.8 |
| Balance | 100.0 |

*Pregnant liquor*

| | Percent |
|---|---|
| $H_2SO_4$ | 35.0 |
| $Al_2(SO_4)_3$ | 15.0 |
| $H_2O$ | 50.0 |
| Balance | 100.0 |

The pregnant liquor was crystallized by cooling and 1940 pounds of crystallized slurry were recovered. The slurry was centrifuged and washed with 196.3 pounds of 46% sulfuric acid, and the spent liquor was then recycled. The product, amounting to 556.8 pounds, analyzed as follows:

| | Percent |
|---|---|
| $Al_2(SO_4)_3 \cdot XH_2O$ | 82.4 |
| $H_2SO_4$ | 8.1 |
| $H_2O$ | 9.5 |
| Balance | 100.0 |

The product was neutralized by heating to about 100° C., at which temperature the salt dissolved in its own water of crystallization, and adding 25.4 pounds of alumina trihydrate. During the neutralization, 76.2 pounds of water were driven off, and the final product, amounting to 506 pounds was of +98 percent purity.

The spent liquor, containing 55.3 pounds of aluminum sulfate (3.5%) and about 0.5% of $Fe_2O_3$, was recycled to the leaching operation.

Recovery of the contained aluminum values was in this case over 95%.

The procedures described above were repeated for a total of twenty cycles, recycling the recovered acid in each case. During and after the last cycle, analyses were made of the leach acid (spent liquor plus fresh acid), the pregnant liquor, the spent liquor, and the crystal product. Results were as follows:

| Material | Percent $H_2SO_4$ | Percent $Al_2O_3$ | Percent $Fe_2O_3$ | Percent $K_2O$ | Percent CaO | Percent MgO | Percent $Na_2O$ | Percent $SiO_2$ |
|---|---|---|---|---|---|---|---|---|
| Leach Acid | 57.07 | 0.96 | 0.29 | | | | | |
| Pregnant Liquor | 34.06 | 4.35 | 0.64 | | | | | |
| Spent Liquor | 40.65 | 1.51 | 0.66 | | | | | |
| Crystals | 9.05 | 12.98 | 0.060 | 0.26 | 0.021 | 0.052 | 0.026 | 0.04 |

After washing and recrystallization treatments, the crystals contained only 0.006% $Fe_2O_3$. It should be noted that in the table above, 12.98% $Al_2O_3$ corresponds to approximately 83% hydrated aluminum sulfate; entrained, but not combined, water accounts for the remainder of the analysis of the crystals.

EXAMPLE II

A Jamaican bauxite ore was selected for extensive testing of the process of the invention. Several six-hundred (600) gram samples were ground to approximately 50%–325 mesh. Chemical analysis of this ore and the particle size distribution (screen analysis) are shown below:

| | Percent | Grams (600 gm. sample) |
|---|---|---|
| $Al_2O_3$ | 56.79 | 340.74 |
| $Fe_2O_3$ | 22.30 | 133.80 |
| $SiO_2$ | 15.00 | 90.00 |
| $TiO_2$ | 2.69 | 16.14 |
| Mn | 0.54 | 3.24 |
| $Na_2O$ | 0.32 | 1.92 |
| $K_2O$ | 0.06 | .36 |
| CaO | 0.16 | .96 |
| MgO | 0.12 | .72 |
| Cu | 0.011 | .06 |
| Ni | 0.037 | .22 |
| $H_2O$ at 110° C | 0.98 | 5.88 |
| Loss on ignition | 1.27 | 7.62 |
| | 100.278 | 601.66 |

| Mesh Size | Percent | Cum. Percent |
|---|---|---|
| +80 | 1.3 | 1.3 |
| +140 | 12.2 | 13.5 |
| +200 | 18.9 | 32.4 |
| +325 | 16.4 | 48.4 |
| −325 | 51.1 | 99.9 |
| Total | 99.9 | |

A single six-hundred (600) gram sample was leached for 1½ hours with 4000 grams of 48.2° Bé. (60%) sulfuric acid at a temperature of approximately 146° C. The leaching vessel was provided with a stirrer and a reflux condenser. After leaching was completed, the vessel was cooled to 70° C. and sulfur dioxide was bubbled through the slurry for thirty (30) minutes. During this latter period, agitation with the stirrer continued. The slurry was then filtered in a vacuum filter, the silica residue was washed with 500 grams of a hot, 40% sulfuric acid solution, which was added to the filtrate, and with 700 grams of hot water. Hydrated aluminum sulfate was crystallized from the solution at ambient temperature and thereafter the crystals were centrifugally separated from the spent liquor. After washing to remove entrained acid, 1,967 grams of hydrated crystals were recovered, representing a recovery of approximately 84.2 percent of the aluminum values contained in the bauxite. Of the remaining 15.8 percent of aluminum, approximately 12 percent (22.1 grams $Al_2O_3$) was contained in the recycled acid, thus becoming a circulating load, which remained approximately constant in subsequent cycles. Over-all recovery was therefore in the range of about 96%. Iron in the recovered crystals analyzed less than 0.15% $Fe_2O_3$.

EXAMPLE III

A second six-hundred (600) gram sample was treated as described in Example II, except that the sulfur dioxide treatment after leaching and prior to filtration was omitted.

Recovery of aluminum values was approximately the same as that reported in Example II, but the iron content was 1.8 percent, as opposed to the lower figure reported in Example II.

EXAMPLE IV

Eight additional samples were treated in the manner described in Example II.

Tests were run consecutively, i.e., the first test in the group utilizing acid recycled from the test in Example II, and subsequent tests re-using the same acid (with, of course, appropriate additions of fresh make-up acid). To determine the effectiveness of iron removal, the silica- and iron-containing residue from each test was dried and analyzed, and the iron content of the spent liquor was also analyzed. Thus, the percentage of iron recovery determined was for the total iron in the system (iron in the ore plus iron in the spent liquor). Results are also reported for iron removal as a percentage of new iron credits added to the system for each test. It will be noted that iron removal in test F was unaccountably low; it is of particular significance to note, however, that in the succeeding test, where the iron content of the spent liquor was very high (1.10 percent), the percentage of iron removal was again high. It is to be further noted that if the results of test F are discounted, the average of recoveries goes up to 87.1 percent and removal of new iron credits in each test goes up to about 100 percent.

After the last test (Test H), the spent liquor contained 0.45 percent $Fe_2O_3$, which was 0.21 percent less than it contained after Test A, indicating that there is no tendency for iron to build up in the system. Purity of the recovered crystals was essentially constant throughout, with the exception of Test F, and averaged the same as reported in Example II.

IRON RECOVERY IN RESIDUE—WITH $SO_2$

| Test | $Fe_2O_3$ in residue, gms. | $Fe_2O_3$ in feed (total), gms. | Percent of total $Fe_2O_3$ in residue | Percent of new $Fe_2O_3$ in residue |
|---|---|---|---|---|
| A | 134.0 | 156.7 | 85.4 | 100.1 |
| B | 123.1 | 144.6 | 85.2 | 92.0 |
| C | 123.5 | 151.5 | 81.5 | 92.3 |
| D | 141.1 | 156.2 | 90.3 | 105.5 |
| E | 142.3 | 145.9 | 97.6 | 106.4 |
| F | 105.4 | 139.5 | 75.3 | 78.8 |
| G | 142.9 | 159.0 | 89.8 | 106.8 |
| H | 131.2 | 149.4 | 87.8 | 98.1 |
| Average | | | 86.6 | 93.0 |

EXAMPLE V

The tests of Example IV were duplicated on eight additional six-hundred gram samples, except that the sulphur dioxide treatment after leaching and prior to filtration was omitted.

The tests were run in parallel with the tests described in Example IV and, as in that example, Test F' showed poor iron removal. The remainder of the results, however, were within a small percentage of the results obtained with the $SO_2$ addition, showing that this particular material (bauxite ore) produces suitable results, in terms of product purity, without added $SO_2$. The spent liquor contained 0.51 percent $Fe_2O_3$ after the last test, only negligibly higher than in the tests where $SO_2$ was used. As in Example III, the crystals contained slightly more iron than was present when $SO_2$ was added, but the increase was not considered significant.

IRON RECOVERY IN RESIDUE—WITHOUT $SO_2$

| Test | $Fe_2O_3$ in residue, gms. | $Fe_2O_3$ in feed (total), gms. | Percent of total $Fe_2O_3$ in residue | Percent of new $Fe_2O_3$ in residue |
|---|---|---|---|---|
| A' | 143.1 | 155.2 | 92.2 | 102.0 |
| B' | 126.4 | 142.6 | 88.6 | 94.5 |
| C' | 129.8 | 146.3 | 88.7 | 97.0 |
| D' | 119.3 | 146.3 | 81.6 | 89.2 |
| E' | 144.3 | 155.1 | 92.9 | 107.8 |
| F' | 72.8 | 138.1 | 52.7 | 54.4 |
| G' | 162.9 | 177.2 | 91.8 | 121.7 |
| H' | 128.4 | 143.3 | 89.5 | 96.0 |
| Average | | | 84.8 | 88.2 |

EXAMPLE VI

To provide a positive check on the build-up of any impurities and to determine the distribution of all significant impurities, the residue, spent liquor, and crystals produced from the last cycle in the tests conducted in Examples IV and V were analyzed for impurity elements present in the original charge.

The percentage analyses show no impurities above the harmful level in either the crystals or the spent liquor. It is to be noted that while the distribution of the impurities shows a substantial proportion of some impurities going into the spent liquor and crystals, this does not mean that these products were highly contaminated. Thus, while 65.9% of the manganese present reported out in the spent liquor, this only amounted to 0.19% concentration of manganese in the spent liquor. The results of these tests are shown in tabulated form below.

DISTRIBUTION OF IMPURITIES AFTER LAST CYCLE

| | Silica Residue | Spent Liquor | Crystals |
|---|---|---|---|
| With $SO_2$: | | | |
| $Fe_2O_3$ (percent) | 90.9 | 8.1 | 1.0 |
| $TiO_2$ (percent) | 55.7 | 40.8 | 3.5 |
| Mn (percent) | 27.2 | 65.9 | 6.9 |
| Without $SO_2$: | | | |
| $Fe_2O_3$ (percent) | 89.6 | 9.3 | 1.1 |
| $TiO_2$ (percent) | 53.4 | 43.2 | 3.5 |
| Mn (percent) | 30.8 | 62.6 | 6.6 |

(3.3% $Fe_2O_3$), in both the as-received and dried conditions.

Samples were leached in 57.7% sulfuric acid for a period of two hours at boiling, the acid being present in an 8:1 pulp ratio (8 milliliters $H_2SO_4$ per gram of clay), and filtered at approximately 100° C. The separated residues were washed with 100 milliliters of hot 57.5% acid and 600 milliliters of hot water, the washes being applied in small portions to obtain maximum efficiency.

The residues were then dried and analyzed, and showed the following results:

| | $Al_2O_3$ Extraction, Percent | $Fe_2O_3$ Removal, Percent |
|---|---|---|
| Low-iron clay | 94.1 | 87.7 |
| Low-iron clay (dried) | 94.0 | 89.6 |
| High-iron clay | 94.0 | 97.9 |
| High-iron clay (dried) | 94.7 | 95.9 |

The filtrate was not treated further, as it was known on the basis of previous experiments, reported hereinbefore, that the iron remaining in the solution would not contaminate the crystals, becoming a circulating but harmless load in the recycle acid.

In the treatment of some alumina-bearing materials which prove to be difficultly digestible on direct leaching, it frequently serves to increase the percentage extraction of alumina if these materials are subjected to a preliminary acid or thermal cracking operation. For example, acid cracking can be effected by mixing the finely-divided material with a sufficient quantity of strong sulfuric acid (60–98% concentration) to effect substantially complete decomposition of the same. In general, the sulfuric acid should be employed in theoretical quantities according to the metallic constituents of the material undergoing decomposition, plus about ten percent (10%) excess. The material is digested to a solid cake-like consistency, and, preferably, the resulting decomposed solid mass is then heated to approximately 200° C., or higher, to dehydrate gelatinous silica for purposes of facilitating eventual filtering. The solid cake from the decomposition stage is then broken up by any suitable means and used as the feed to the acid leaching stage of the process.

Having thus described the subject matter of the invention, what it is desired to secure by Letters Patent is:

1. In a process for producing neutral aluminum sulfate hydrate from particulate alumina-bearing siliceous material containing iron impurities, the steps that comprise:

subjecting such alumina-bearing material to the leaching action of hot sulfuric acid at a temperature of from 100° C. to the boiling point of said acid; said acid at the start of said leaching action being at a concentration of between 40–80 percent $H_2SO_4$ by weight and being employed in an amount equal to at least twice the normal stoichiometric requirements to produce a pregnant liquor containing aluminum sulfate, and a solid residue comprising silica containing a major portion of the iron impurities present in said material;

separating said pregnant liquor from said solid residue while hot;

PRESENCE OF IMPURITIES AFTER LAST CYCLE

| Material | Percent $Fe_2O_3$ | Percent $TiO_2$ | Percent Mn | Percent $SiO_2$ | Percent Ni | Percent Cu | Percent $Na_2O$ | Percent $K_2O$ | Percent CaO | Percent MgO |
|---|---|---|---|---|---|---|---|---|---|---|
| With $SO_2$: | | | | | | | | | | |
| Silica Residue | 7.73 | 0.90 | 0.12 | 5.35 | 0.006 | 0.002 | 0.03 | 0.03 | 0.03 | 0.01 |
| Spent Liquor | 0.45 | 0.43 | 0.19 | | 0.010 | 0.0017 | 0.10 | 0.08 | 0.04 | 0.04 |
| Crystals | 0.16 | 0.11 | 0.06 | | 0.008 | 0.0005 | 0.006 | 0.02 | 0.04 | 0.04 |
| Without $SO_2$: | | | | | | | | | | |
| Silica Residue | 8.12 | 0.94 | 0.13 | 5.81 | 0.005 | 0.001 | 0.01 | 0.05 | 0.06 | 0.01 |
| Spent Liquor | 0.51 | 0.46 | 0.16 | | 0.011 | 0.0018 | 0.11 | 0.08 | 0.04 | 0.08 |
| Crystals | 0.18 | 0.11 | 0.05 | | 0.005 | 0.0007 | 0.006 | 0.03 | 0.06 | 0.03 |

EXAMPLE VII

Four experiments were carried out to determine the amenability of typical clay materials to the process of the invention. Alumina content of this material is approximately 33–35%, and iron (as $Fe_2O_3$) is approximately 1–3%. Tests were run on one-hundred (100) gram samples of low-iron clay (1.22% $Fe_2O_3$) and high-iron clay providing a $H_2SO_4$ concentration in said pregnant liquor of between 30–46 percent by weight thereof;

cooling said pregnant liquor to effect the direct crystallization therefrom of a neutral aluminum sulfate hydrate; and separating the resulting crystals of said neutral hydrated aluminum sulfate from the resulting mother liquor.

2. The process of claim 1 which includes the step of re-cycling the mother liquor to the acid leaching stage.

3. The process of claim 1 which includes the steps of adjusting the acid concentration of the mother liquor to the concentration desired for the leaching action and re-cycling said mother liquor to the leaching stage.

4. The process of claim 1 further characterized in that the resulting crystals of neutral hydrated aluminum sulfate contain less than 8 percent by weight of entrained free $H_2(SO_4)$.

5. The process of claim 1 further characterized in that the pregnant liquor contains less than 20 percent by weight of aluminum sulfate and the crystallization step is carried out at a temperature of less than 60° C.

6. The process of claim 1 further characterized in that the pregnant liquor contains between 10 and 20 percent by weight of aluminum sulfate.

7. The process of claim 1 further characterized in that the alumina-bearing material is selected from a group consisting of ores, clays, shales, residues and concentrates containing the alumina in combination with iron and silica.

8. The process of claim 5 which includes the step of re-cycling the mother liquor to the acid leaching stage.

9. The process of claim 1 which further comprises the step of treating the pregnant liquor prior to separation of same from said solid residue with a reducing agent to effect reduction of any ferric iron remaining therein to the ferrous state.

10. The process of claim 9 wherein said reducing agent is sulfur dioxide and said treatment is effected at a temperature of from 70 to 71° C.

11. The process of claim 1 which includes the step of washing the aluminum sulfate crystals, after separation from said mother liquor, to remove the major portion of free acid mechanically entrained therein.

12. The process of claim 11 which further comprises the steps of:

dissolving the washed crystals in their own water of crystallization by heating same to an elevated temperature;

neutralizing the resulting solution by the addition thereto of a material selected from the group consisting of aluminum trihydrate and soluble alumina; and cooling said neutralized solution to re-crystallize neutral aluminum sulfate hydrate therefrom.

13. The process of claim 3 which further comprises the step of treating the pregnant liquor prior to separation of same from said solid residue with a reducing agent to effect reduction of any ferric iron remaining therein to the ferrous state.

14. The process of claim 13 wherein said reducing agent is sulfur dioxide and said treatment is effected at a temperature of from 70 to 71° C.

15. The process of claim 14 which includes the step of washing the aluminum sulfate crystals, after separation from said mother liquor, to remove the major portion of free acid mechanically entrained therein.

16. The process of claim 15 which further comprises the steps of:

dissolving the washed crystals in their own water of crystallization by heating same to an elevated temperature;

neutralizing the resulting solution by the addition thereto of a material selected from the group consisting of aluminum trihydrate and soluble alumina; and cooling said neutralized solution to re-crystallize neutral aluminum sulfate hydrate therefrom.

17. The process of claim 16 further characterized in that the pregnant liquor contains between 10 and 20 percent by weight of aluminum sulfate.

18. The process of claim 16 further characterized in that the pregnant liquor contains less than 20 percent by weight of aluminum sulfate and the crystallization step is carried out at a temperature of less than 60° C.

References Cited by the Examiner
UNITED STATES PATENTS 2,476,979 7/49 Hoeman _____ 23—123
3,078,146 2/63 Savage _____ 23—123 X MAURICE A. BRINDISI, *Primary Examiner.*